United States Patent [19]
Lee

[11] Patent Number: 5,331,139
[45] Date of Patent: Jul. 19, 1994

[54] CARD READER WITH ANTIABRASION MEMBER

[75] Inventor: Kwang Hee Lee, Inchon, Rep. of Korea

[73] Assignee: Goldstar Electric Machinery Co., Ltd., Seoul, Rep. of Korea

[21] Appl. No.: 32,254

[22] Filed: Mar. 17, 1993

[30] Foreign Application Priority Data

Mar. 18, 1992 [KR] Rep. of Korea ............... 4344/1992
Sep. 28, 1992 [KR] Rep. of Korea ............. 18413/1992

[51] Int. Cl.$^5$ .............................................. G06K 7/08
[52] U.S. Cl. .................................... 235/449; 235/483; 235/484
[58] Field of Search ..................... 235/449, 483, 484

[56] References Cited

U.S. PATENT DOCUMENTS 5,256,867 10/1993 Chen ................................. 235/483

Primary Examiner—Harold Pitts
Attorney, Agent, or Firm—Oliff & Berridge

[57] ABSTRACT

A card reader having an antiabrasion member for preventing a bottom surface of a card checking passage of the card reader from card contact abrasion. This antiabrasion member is easily inserted in a mold before an injection molding of a main body of the card reader and prevented from displacement in the mold, and allows a magnet head to be easily changed with new one to provide a good compatibility of the magnet head. The plurality of notches prevents the antiabrasion member from being horizontally displaced in a mold and are provided at both sides of the member, and engage with individual ribs of the mold when the member is located in the mold. The slit is provided as a result of lateral cutting of the member between the notches. The resilient part integrally extends from a side of the member near the slit and allows the slit to be inserted in a rib of the mold, and prevents the member from being vertically displaced in the mold.

6 Claims, 7 Drawing Sheets

CARD READER WITH ANTIABRASION MEMBER

BACKGROUND OF THE INVENTION

1. Field of the Invention

The present invention relates in general to a card reader for checking cards, such as credit cards, and more particularly to a card reader having an anitabrasion member preventing a card checking passage of the card reader from being abraded due to direct contact with the card and integrally formed with a main body of the card reader.

2. Description of the Prior Art

Recently, credit cards are regarded as the third currency and wide used instead of cash. Such a wide use of the credit cards is necessarily attended with checking whether the credit card is valid and this causes wide use of the card readers.

Conventionally in order to check whether the credit card has been stolen, lost or expired or it is a card which is unusable as a result of exceeding its credit limit, a card reader reads, by using a magnet head, information recorded on the card and stores the card data, such as the number of remaining months of installment and a totaled amount of used money, in its memory. The card reader in turn transmits the card data to a host computer through a modem employing a public data network. Upon reception of the card data, the host computer analyzes the card data in order to give the inquirer the response. In inquiry of the credit card by employing such a card reader, the information recorded on the credit card should be read by the magnet head so that the card is required to be inserted into a narrower card checking passage, generally formed at the right side of the card reader and provided with the magnet head, and to be rectilinearly reciprocated therein.

With reference to FIGS. 1A and 1B, there is partially shown an embodiment of a conventional card reader. The conventional card reader has a narrower card checking passage 2 which is provided with the magnet head 1 for reading the information recorded on a card (not shown) to be checked. In application, the repeated rectilinear reciprocation of the cards causes the abrasion of a bottom surface of the checking passage 2 due to a contact pressure generated between the bottom surface of the checking passage 2 and the card. In this regard, it has been required to provide the card checking passage 2 with an antiabrasion member for prevention of the contact abrasion of the bottom surface of the passage 2.

In order to achieve such an object, an antiabrasion member 3 of a metal plate has merged with the bottom part of the checking passage 2. Such a merging of the antiabrasion member 3 with the passage 2 is accomplished by inserting this member 3 in an injection mold before an injection molding of a main body 4 of the card reader and, thereafter, molding the main body 4 integrated with the member 3. Here, the antiabrasion member 3 has bent parts 5 at its both ends for facilitating the insertion of the card. In application, the narrower side surface of the card comes into contact with the antiabrasion member 3 instead of the bottom surface of the checking passage 2 when the card is rectilinearly reciprocated in the checking passage 2 with respect to the magnet head 1. Therefore, the bottom surface of the checking passage 2 comes into direct contact with the card and prevented from contact abrasion.

However, such a conventional card reader has a problem in the insertion of the antiabrasion member 3 into the injection mold before the injection molding of the main body 4. Otherwise stated, the insertion of the antiabrasion member 3 into the mold, the insertion having been generally achieved by employing, for example, tweezers since a part of the mold corresponding to the checking passage 2 is narrower and deeper, is very difficult because the member 3 has no grip means. Furthermore, the antiabrasion member 3 is apt to be displaced from its place in the mold even by a slight vibration generated when a movable part and a stationary part of the injection mold engage other, thereby causing the mold to be broken away. In addition, the antiabrasion member 3 having the magnet head 1 at its center portion is integrally formed with the main body 4 of the card reader such that the magnet head 1 can not be changed with new one. Thus, the known card reader has a problem in that the magnet head can not be changed with a low-priced one, the magnet head having been cheaper according to the remarkable technical development in the art, thereby providing no reduction in the manufacturing and maintaining cost.

SUMMARY OF THE INVENTION

It is, therefore, an object of the present invention to provide a card reader in which the aforementioned problems of the known embodiment can be overcome, and of which an antiabrasion member is easily inserted in a mold before an injection molding of a main body of the card reader and prevented from displacement in the mold, and allows a magnet head to be easily changed with new one to provide a good compatibility of the magnet head.

It is another object of the present invention to provide a card reader having an antiabrasion member, which member is easily inserted in an injection mold and not deformed even when it is applied with an external force.

In an aspect, the present invention provides a card reader having an antiabrasion member for preventing a bottom surface of a card checking passage of the card reader from card contact abrasion, wherein the antiabrasion member comprises a plurality of notches for preventing the member from being horizontally displaced in a mold, the notches being provided at both sides of the member and being engaged with individual ribs of the mold when the member is located in the mold; at least one slit being provided as a result of laterally cutting the member throughout the width of the member, the slit being positioned between the notches; and at least one erected resilient part integrally extending from a side of the member near the slit, the resilient part allowing the slit to be inserted in a rib of the mold and preventing the member from being vertically displaced in the mold.

In another aspect, the present invention provides a card reader having an antiabrasion member for preventing a bottom surface of a card checking passage of the card reader from card contact abrasion, wherein the antiabrasion member comprises a plurality of notches for preventing the member from being horizontally displaced in a mold, the notches being provided at both sides of the member and being engaged with individual ribs of the mold when the member is located in the mold; at least one slit being provided as a result of laterally partially cutting the width of the member, the slit being positioned between the notches; and at least one erected resilient part integrally extending from a side of the member near the slit, the resilient part allowing the slit to be inserted in a rib of the mold and preventing the member from being vertically displaced in the mold.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1A:
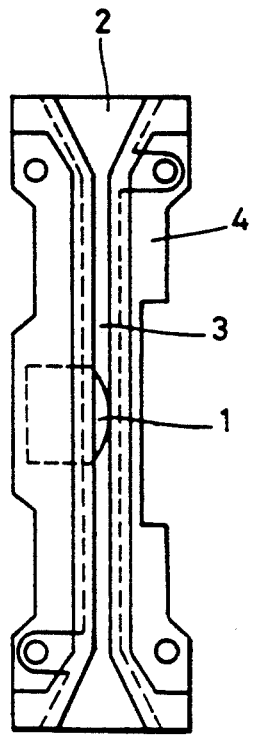
FIG. 1A is a plan view of a known card reader having an antiabrasion member integrally formed with the card reader.
Figure 1B:
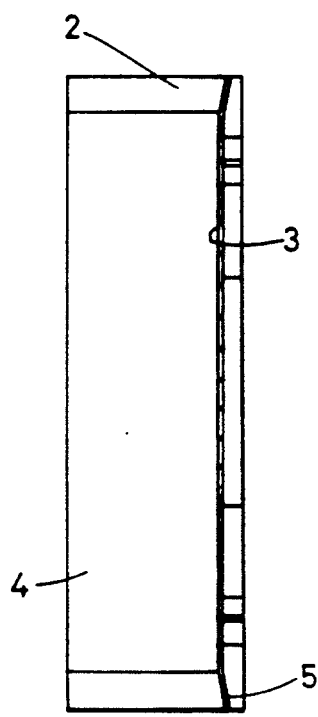
FIG. 1B is a longitudinal sectional view of the card reader of FIG. 1A.
Figure 2:
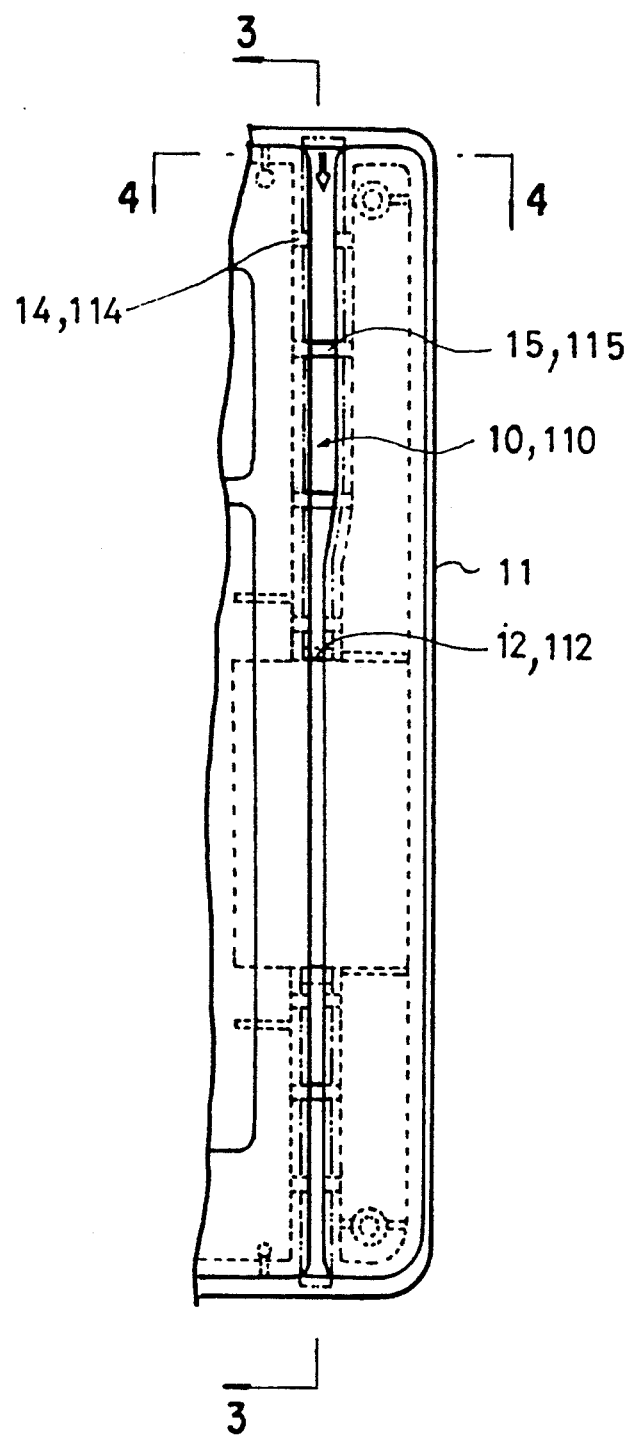
FIG. 2 is a view corresponding to FIG. 1A, but showing the present invention.
Figure 5:
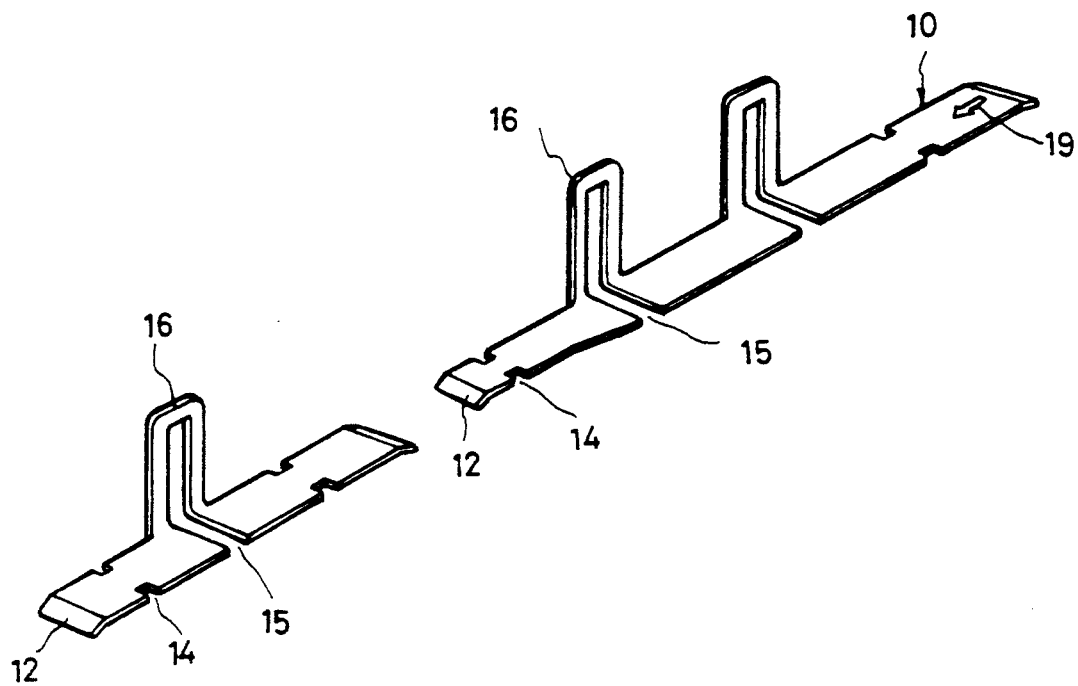
FIG. 5 is a perspective view of an embodiment of an antiabrasion member of the present invention.
Figure 6:
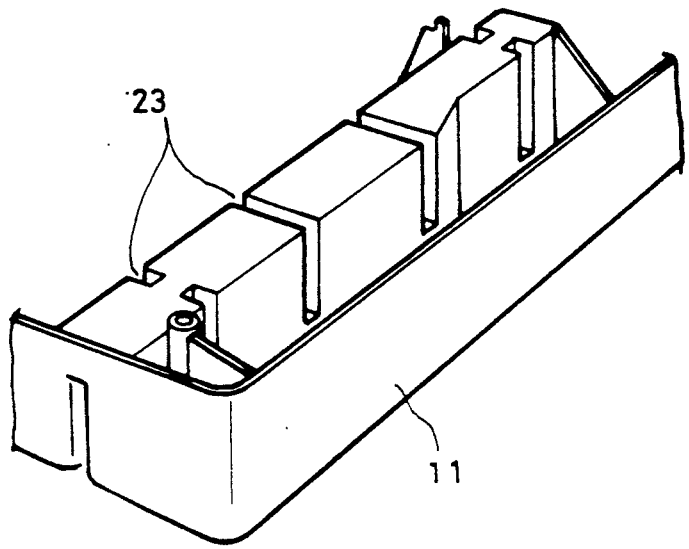
FIG. 6 is a perspective bottom view of the card reader of FIG. 2.

With reference to FIGS. 2 to 6, FIGS. 2, 3 and 4 show a card reader of this invention, FIG. 5 shows an embodiment of an antiabrasion member of this invention, and FIG. 6 shows the bottom profile of the card reader of FIG. 2.

As best seen in FIG. 5, the antiabrasion member 10 of this invention has notches 14 at both sides near the ends thereof. These notches 14 are to engage with individual ribs 13 of a stationary part 21 of an injection mold, which will be described again in conjunction with FIG. 8A, when the member 10 is inserted in the mold before the injection molding process of a main body 11 of the card reader. Such an engagement of the notches 14 with the ribs 13 efficiently prevents the member 10 from horizontal linear displacement in the mold even when it is influenced by a vibration. This antiabrasion member 10 also has a lateral slit 15 which is provided as a result of cutting the width of the member 10 and makes the member 10 be divided into separated parts. However, these separated parts are connected to each other by a resilient part 16 which integrally extends from a side of the member 10 and erected to be perpendicular to the plane of the member 10. The antiabrasion member 10 preferably has two slits 15 and two resilient parts 16, but may have one slit 15 and one resilient part 16 as shown in FIG. 5. The slit 15 is stably inserted between ribs 17 of the mold when this member 10 is located in the mold, thereby preventing the member 10 from possible vertical displacement in the mold. Here, the erected resilient part 16 defines a grip for handling this member 10 when the member 10 is located in the stationary part 21 of the mold.

From the viewpoint of a fact that a magnet head 18 has been cheaper as a result of the remarkable technical development in the art, it is preferred to form the antiabrasion member 10 in a separated type and to arrange the separated parts of the member 10 in the card reader to be spaced apart from each other and to provide a space for receiving the magnet head. Such an arrangement of the member 10 allows the magnet head to be changed with new one. Of course, this separated type of antiabrasion member 10 has the notches 14 and the resilient part 16, having the slit 15, in the same manner as described above. However, the antiabrasion member 10 may be formed in an integral type other than the aforementioned separated type. In addition, this antiabrasion member 10 is formed with an arrow-shaped through hole 19 at its card introduction part and a light emitting diode (LED) 20 is arranged in the card checking passage of the card reader such that it aligns with the through hole 19 as best seen in sectional view of FIG. 4. This LED 20 allows, in cooperation with the arrow-shaped through hole 19, the inquirer to check the inserting position and feeding direction of the card to be inquired.

Figure 7:
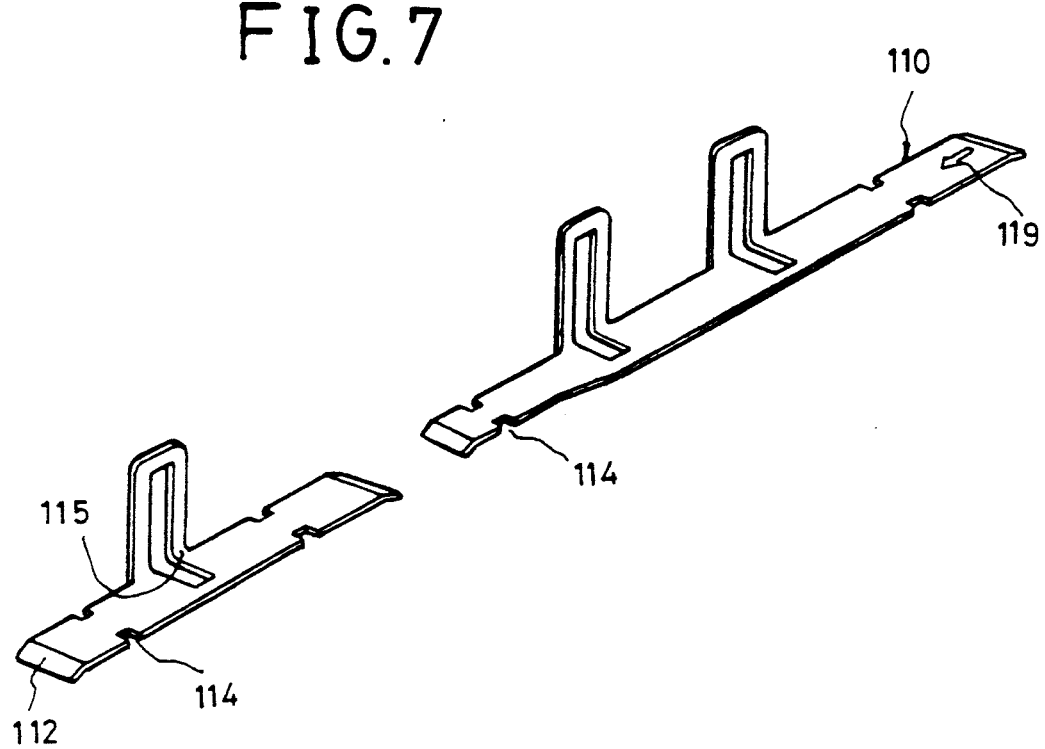
FIG. 7 is a view corresponding to FIG. 5 but showing another embodiment of the present invention.

Turning to FIG. 7, there is shown a second embodiment of an antiabrasion member of the present invention. In this second embodiment, the general shape remains the same as in the primary embodiment shown in FIGS. 5A and 5B, but the structure of the slit thereof is altered. The elements of this second embodiment are specified by "100" series numerals. As shown in these drawings, the antiabrasion member 110 has the notches 114 and the slit 115. Here, this slit 115 is provided as a result of partially cutting the width of the member 110 differently from the primary embodiment where the member 10 is cut throughout the width thereof to provide the through slit 15. Thanking for such a construction of the slit 115, this member 110 is efficiently prevented from being deformed even when it is applied with an outside force. In the same manner as the primary embodiment, a resilient part 116 is integrally formed with the member 110 at a side of the slit 115 and erected to be perpendicular to the plane of the member 110. Here, the erected resilient part 116 functions as a grip when this member 110 is inserted into the stationary part 21 of the mold. In addition, the antiabrasion member 110 preferably has two slits 115 and two resilient parts 116, but may have one slit 115 and one resilient part 116 as shown in FIG. 7.

Hereinafter, the operational effect of this invention will be described. For convenience, let the antiabrasion member be the primary embodiment 10 and be separated into parts for providing the space for the magnet head 18 therebetween.

In inserting the separated-type antiabrasion member 10 of this invention into the injection mold before the injection molding of the main body 11 of the card reader, one part of the member 10 is stably inserted into the stationary part 21 of the injection mold as gripping the resilient part 16 such that the notches 14 and the slit 15 of the member 10 engage with individual ribs 13 and 17 of the stationary part 21 of the mold. When the insertion of the one part of the member 10 into the stationary part 21 is accomplished, this part of the member 10 maintains in its place since it is prevented from the horizontal displacement thanking for the notches 14 engaging with the rib 13 as well as the vertical displacement thanking for the slit 15 and the resilient part 16.

Figure 3:
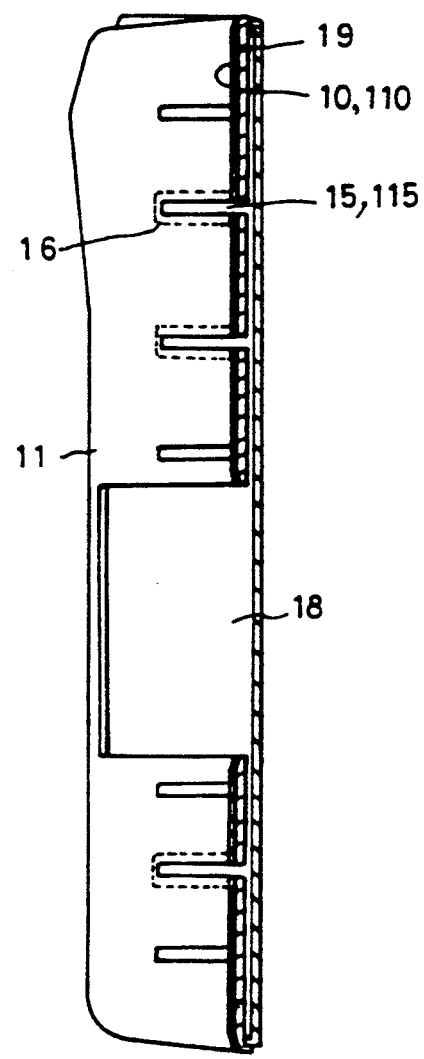
FIG. 3 is a longitudinal sectional view of the card reader taken along the section line A—A of FIG. 2.
Figure 4:
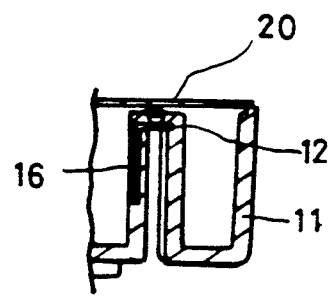
FIG. 4 is a cross sectional view of the card reader taken along the section line B—B of FIG. 2.
Figure 8:
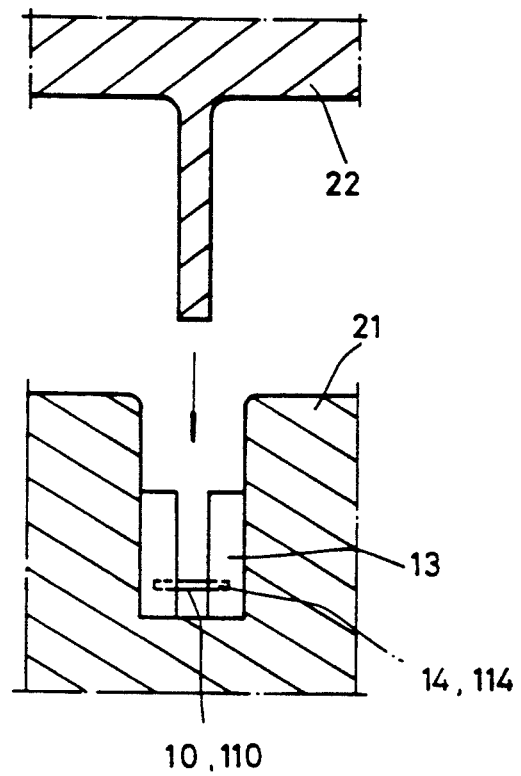
FIG. 8A is a sectional view showing an injection mold where a notch part of the antiabrasion member is located in a stationary part of the mold.
FIG. 8B is a sectional view showing the notch part of the antiabrasion member integrated with a main body of the card reader after the injection molding.
Figure 8:
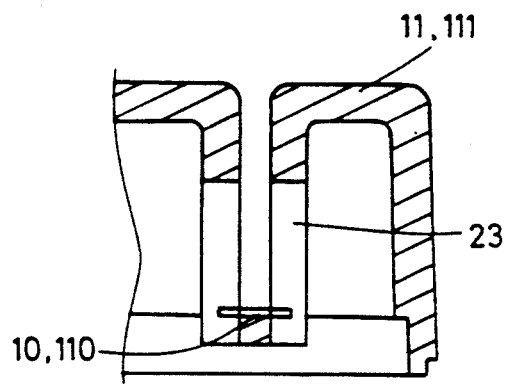
Figure 9A:
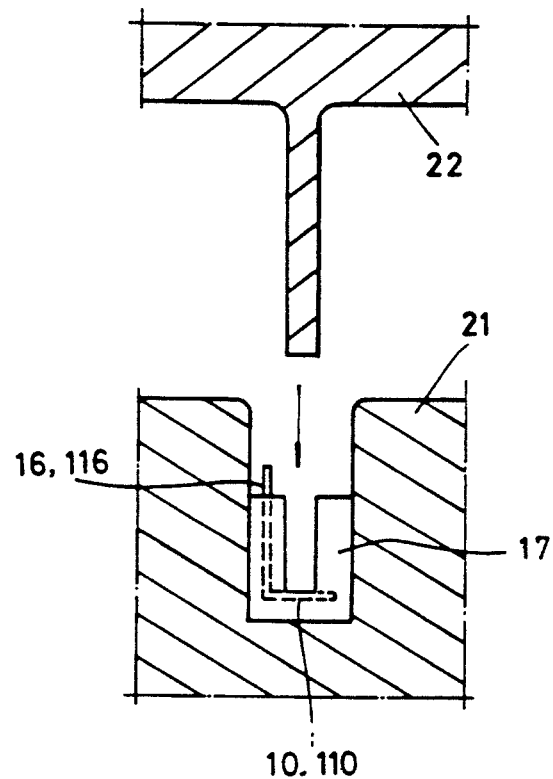
FIG. 9A is a sectional view showing the injection mold where a resilient part of the antiabrasion member is located in the stationary part of the mold.
Figure 9B:
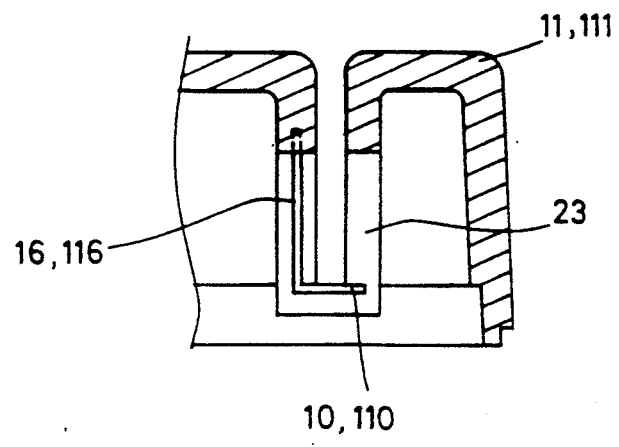
FIG. 9B is a sectional view showing the resilient part of the antiabrasion member integrated with the main body of the card reader after the injection molding.

After accomplishment of the insertion of the one part the member 10, the other part of the member 10 is inserted into the stationary part 21 of the mold in the same manner as described above. Upon accomplishing the insertion of the other part of the member 10, the movable part 22 of the mold is combined with the stationary part 21 having the antiabrasion member 10 and, thereafter, the injection molding process for the main body 11 is carried out. As result of the injection molding, the member 10 is integrally formed with the main body 11 of the card reader such that the card contact surfaces of the member 10 are integrally formed with the main body 11 and the upper part of the resilient part 16 is inserted in a side wall of the card checking passage of the card reader as best seen in FIGS. 8B and 9B, respectively. In addition, a plurality of air circulation slots 23 are provided, thanking for the ribs 13 and 17 of the stationary part 21 of the mold, in the main body 11 near the slit 15 and the notches 14 of the member 10 as depicted in FIGS. 6, 8B and 9B, thereby causing no additional air exhaust port to be provided in the main body 11. The main body 11 obtained from the injection molding is, thereafter, equipped with a magnet head 18 in the space defined between the separated parts of the antiabrasion member 10 as depicted in FIGS. 2 and 3. When this result card reader is applied with outside electric power, the LED 20 is turned on and emits the light which is leaked through the arrow-shaped through hole 19 of the member 10 and this allows the inquirer to know the inserting position and the feeding direction of the card to be inquired.

On the other hand, the antiabrasion member 10 of this invention is constructed to be separated and to provide a space for receiving the magnet head 18 and this allows the magnet head 18 to be changed with low-priced one and, as a result, reduces the manufacturing cost of the card reader.

As described above, the present invention provides a card reader with an integrated antiabrasion member having at least one resilient part provided with a slit, thereby causing the antiabrasion member to be easily stably inserted into the injection mold before the injection molding of the main body of the card reader. In addition, this antiabrasion member may be separated into parts to provide a space for receiving a magnet head and this allows the magnet head to be changed with new one, thereby providing the compatibility of the magnet head.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A card reader having an antiabrasion member for preventing a bottom surface of a card checking passage of said card reader from card contact abrasion, wherein said antiabrasion member comprises:
   a plurality of notches for preventing said member from being horizontally displaced in a mold, said notches being provided at both sides of said member and being engaged with individual ribs of said mold when said member is located in said mold;
   at least one slit being provided as a result of laterally cutting said member throughout the width of said member, said slit being positioned between said notches; and
   at least one erected resilient part integrally extending from a side of said member near said slit, said resilient part allowing said slit to be inserted in a rib of said mold and preventing said member from being vertically displaced in said mold.

2. A card reader according to claim 1, wherein said antiabrasion member is separated into two parts, said two parts being positioned at both sides of a magnet head of said card reader, respectively.

3. A card reader according to claim 1, wherein said antiabrasion member further comprises an arrow-shaped through hole for leaking the light at its card introduction part.

4. A card reader having an antiabrasion member for preventing a bottom surface of a card checking passage of said card reader from card contact abrasion, wherein said antiabrasion member comprises:
   a plurality of notches for preventing said member from being horizontally displaced in a mold, said notches being provided at both sides of said member and being engaged with individual ribs of said mold when said member is located in said mold;
   at least one slit being provided as a result of laterally partially cutting the width of said member, said slit being positioned between said notches; and
   at least one erected resilient part integrally extending from a side of said member near said slit, said resilient part allowing said slit to be inserted in a rib of said mold and preventing said member from being vertically displaced in said mold.

5. A card reader according to claim 4, wherein said antiabrasion member is separated into two parts, said two parts being positioned at both sides of a magnet head of said card reader, respectively.

6. A card reader according to claim 4, wherein said antiabrasion member further comprises an arrow-shaped through hole for leaking the light at its card introduction part.

* * * * *